(12) United States Patent
Hunter et al.

(10) Patent No.: US 7,885,945 B2
(45) Date of Patent: Feb. 8, 2011

(54) SECURE SCHEMA IDENTIFIER GENERATION

(75) Inventors: Jason T. Hunter, Redmond, WA (US); David J. Nettleton, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 280 days.

(21) Appl. No.: 11/287,529

(22) Filed: Nov. 23, 2005

(65) Prior Publication Data

US 2007/0050395 A1    Mar. 1, 2007

Related U.S. Application Data

(60) Provisional application No. 60/711,242, filed on Aug. 25, 2005.

(51) Int. Cl.
G06F 17/30 (2006.01)
(52) U.S. Cl. .................... 707/698; 380/30
(58) Field of Classification Search ............ 707/698; 380/30
See application file for complete search history.

(56) References Cited

U.S. PATENT DOCUMENTS

| | | | |
|---|---|---|---|
| 6,009,176 A * | 12/1999 | Gennaro et al. | 713/170 |
| 6,041,411 A | 3/2000 | Wyatt | |
| 6,088,717 A * | 7/2000 | Reed et al. | 709/201 |
| 6,360,218 B1 * | 3/2002 | Zander et al. | 707/7 |
| 6,401,239 B1 | 6/2002 | Miron | |
| 6,411,961 B1 | 6/2002 | Chen | |
| 6,636,870 B2 * | 10/2003 | Roccaforte | 707/104.1 |
| 6,842,741 B1 * | 1/2005 | Fujimura | 705/59 |
| 6,891,953 B1 | 5/2005 | Demello et al. | |
| 2002/0049749 A1 * | 4/2002 | Helgeson et al. | 707/3 |
| 2003/0018786 A1 * | 1/2003 | Lortz | 709/226 |
| 2003/0095660 A1 | 5/2003 | Lee et al. | |
| 2004/0024688 A1 | 2/2004 | Bi et al. | |
| 2004/0193388 A1 * | 9/2004 | Outhred et al. | 703/1 |

(Continued)

FOREIGN PATENT DOCUMENTS

KR      20040034327 A      4/2004

(Continued)

OTHER PUBLICATIONS

International Search Report dated Jan. 2, 2007 for PCT Application Serial No. PCT/US2006/030737, 3 Pages.

(Continued)

*Primary Examiner*—Isaac M Woo
*Assistant Examiner*—Johnese Johnson
(74) *Attorney, Agent, or Firm*—Turocy & Watson, LLP

(57) ABSTRACT

A system that generates a unique identifier that employs a public key of a cryptographic key pair as a contribution to a name for an attribute associated with a schema. Additionally, a hash over the relevant entity name, version, and culture can be employed to automatically produce the remaining portion of the unique identifier. The innovation can ensure that the unique identifiers used by a schema are mathematically related to a public key in a way that can not be spoofed by malicious agents. To this end, unique identifiers can be computed at installation time by combining the n-bytes of the public key (or a hash, e.g., SHA1, of the public key) with the first n-bytes of another entity-specific hash (e.g., SHA1) computed with respect to specific attributes.

4 Claims, 7 Drawing Sheets

U.S. PATENT DOCUMENTS

| | | | |
|---|---|---|---|
| 2005/0050516 A1* | 3/2005 | Mysore | 717/114 |
| 2005/0071801 A1 | 3/2005 | Jesse et al. | |
| 2005/0091259 A1 | 4/2005 | Parthasarathy et al. | |
| 2005/0102297 A1* | 5/2005 | Lloyd et al. | 707/100 |
| 2005/0114653 A1* | 5/2005 | Sudia | 713/158 |
| 2005/0262480 A1* | 11/2005 | Pik et al. | 717/120 |
| 2006/0259458 A1 | 11/2006 | Hunter et al. | |

FOREIGN PATENT DOCUMENTS

| | | |
|---|---|---|
| KR | 20040083988 A | 10/2004 |

OTHER PUBLICATIONS

OA dated Nov. 27, 2009 for U.S. Appl. No. 11/367,212, 29 pages.

OA dated Dec. 1, 2008 for U.S. Appl. No. 11/367,212, 31 pages.

OA dated Apr. 13, 2009 for U.S. Appl. No. 11/367,212, 33 pages.

OA dated Apr. 29, 2008 for U.S. Appl. No. 11/367,212, 25 pages.

A.S. Tanenbaum, et al. Distributed Systems: Principles and Paradigms. Prentice Hall, Upper Saddle River, New Jersey, USA, 2002, Title Pages and Chapter 8, pp. iii-v and 413-491.

* cited by examiner

SECURE SCHEMA IDENTIFIER GENERATION

CROSS-REFERENCE TO RELATED APPLICATIONS

This application claims the benefit of U.S. Provisional Patent application Ser. No. 60/711,242 entitled "SECURE SCHEMA IDENTIFIER GENERATION" and filed Aug. 25, 2005. This application is related to pending U.S. patent application Ser. No. 11/167,350 entitled "SCHEMA SIGNING AND JUST-IN-TIME INSTALLATION" filed on Jun. 27, 2005. The entireties of the above-noted applications are incorporated by reference herein.

BACKGROUND

Technological advances in computing systems have been directed toward increasing the commonality of data thus enabling sharing, compatibility and interoperability between machines. For example, frequently, a user may have data on one device and desire to share the data with a different device and/or application. Today, so long as the systems are pre-configured to accept specific data formats and types, computers can share data between applications and users.

However, these conventional systems are not extensible. In other words, if the correct schema is not available on the destination device, the data cannot be transferred. As well, in order to maintain free data exchange, a user cannot add or modify types at an origination location (e.g., server) without the same additions and/or modifications being installed at the destination location (e.g., client). To this end, the destination location (e.g., client) must be equipped (e.g., maintain necessary schema information) to accept incoming data from a disparate device and/or application.

Developments in computing systems have been directed to employing a platform that utilizes the benefits of database technology. Oftentimes, these developments incorporate these database-specific benefits into the file system. However, these systems share the same schema compatibility drawbacks described above. As such, today, in order to effectively transfer and share data, the data in the file system must conform to a predefined common schema(s). Of course, a schema can be defined as a declarative way of describing the form (e.g., structure) of the data.

In emerging file systems, objects can be stored in the database (e.g., file system) and, accordingly, can be described by an applicable schema. Data in these file systems is an instance of specific schemas and types; the types are defined in the schema which defines the shape (e.g., structure) of the data. If a new type is desired to be added to the system, e.g., a new set of objects or a new form of data the system can work with, the developer would need to create a schema and a type within it. Next, properties would be added to the type.

A number of scenarios exist in which data has to be saved to a file system store (or other database) for which the required schema(s)/type(s) are not already installed. This is known as the "store down-level" problem. In conventional systems, only system administrators and/or persons with specialized authorizations could install schema information.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The signing of a schema can facilitate a system to eliminate the threat of schema squatting. This can be achieved by using the public key of a mathematically related cryptographic key pair as a part of the schema's name. Use of the key in a given schema name requires the possession of the private key of that key pair. Since only the original schema owner has the private key, only the original schema owner can be sure to provide the corresponding public key. Accordingly, this provides protection against both accidental and intentional squatting. Another attack vector for squatting can occur through any unique identifier that the schema contains.

In accordance therewith, the subject novel innovation can employ the public key of a cryptographic key pair as a contribution to the unique identifier's value. Additionally, one or more hashes over the relevant entity names can be employed to automatically produce the remaining portion of the unique identifier. In accordance with aspects of the innovation, unique identifiers are used to identify entities—rather than the full strong name for the entity. It will be appreciated that the use of unique identifiers can offer various performance benefits since the unique identifier can be significantly smaller than the strong name and/or fixed rather than variable in length.

One particular aspect of the innovation ensures that the unique identifiers used by a schema are mathematically related to a public key in a way that can not be spoofed by malicious agents. To this end, unique identifiers will be computed at installation time by combining the n-bytes of the public key (or a hash, e.g., SHA1, of the public key) with the first n-bytes of one or more hashes (e.g., SHA1) computed with respect to specific attributes. For example, in a library schema scenario, the other hashes can include a namespace, version, culture and element name. Similarly, in a platform schema scenario, the other hashes can include a namespace, culture and element name. It is to be understood that, in the platform scenario aspect, the version number is not taken into account when computing the unique identifier.

Once unique identifiers have been computed they might have the form (for 16-byte identifiers whose first 8-bytes are from the public key):

AAAAAAAA-AAAA-AAAA-BBBB-BBBBBBBBBBBB

Where the A's are replaced by the first 8-bytes of hash (e.g., SHA1) of the public key and the B's are replaced with the first 8-bytes of the other hash value(s) (e.g., SHA1) computed as described above. In still another aspect, A's can be employed first if there is a desire to have better clustering in the metadata catalog around values from the same schema. Other aspects exist where orientation is reversed or alternatively configured.

Although a 16-byte identifier is illustrated, other aspects can employ identifiers of alternate lengths so long as the length is within the bounds of the key and hash sizes used. The unique identifiers computed using the novel mechanism will be stable across all uses of the schema and can be coded against. Furthermore, the fully computed unique identifiers will be available for query in the metadata catalog, thus circumventing the need for each client, or other agent, to dynamically regenerate and map the identifiers and so delivering a performance optimization.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
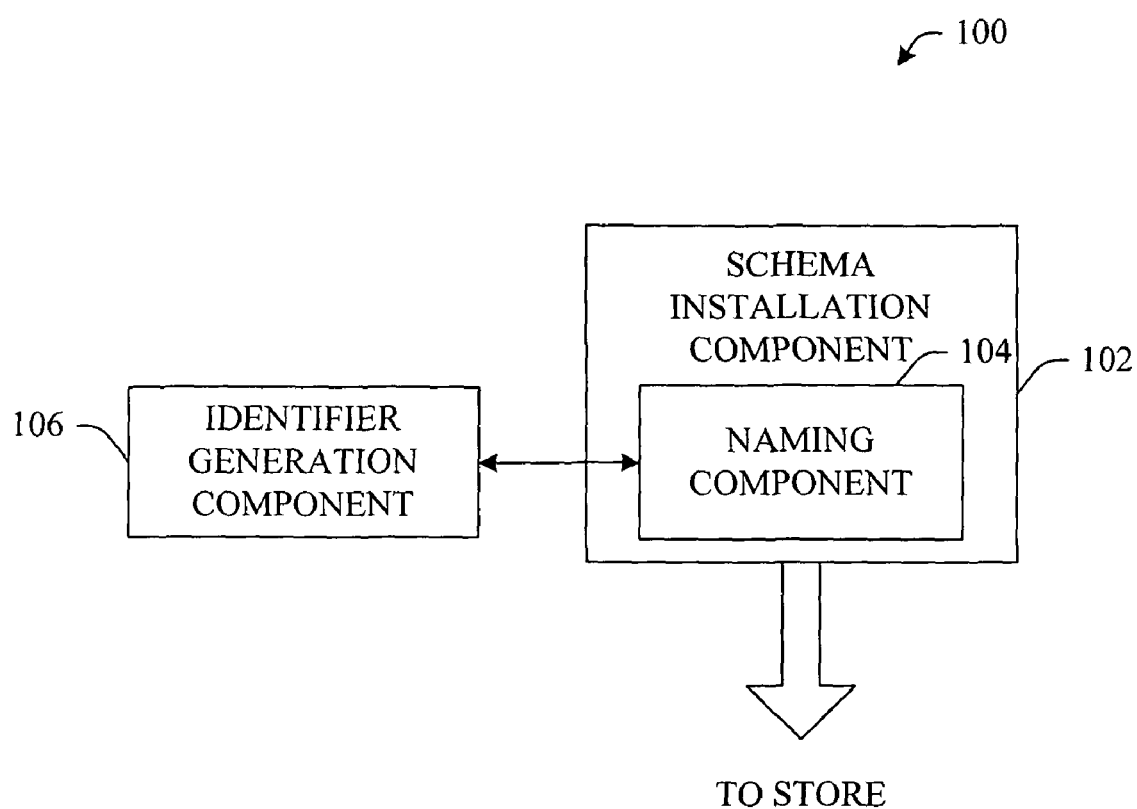
FIG. 1 is a block diagram of a system that facilitates secure schema identifier generation in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject innovation can enable uninhibited transfer of data from one machine to another while enabling that, whenever the data arrives at the second machine, the metadata that is needed with regard to the data is already present at the second machine. Additionally, the subject innovation can coordinate schema information between components while maintaining the security with respect to the schema information. In doing so, the innovation can generate a unique identifier, or set of identifiers, that corresponds to an attribute or set of attributes. This unique identifier can be employed to securely identify attributes of a schema in a metadata catalog.

As described supra, frequently, a user will have data on a computer and will want to share this data between applications and users. However, in some situations, necessary information (e.g., schema) may not be available to enable the sharing of the data. There are a number of problems with the manner in which conventional systems effect the sharing of data. As described supra, conventional systems are not extensible. For example, it is often difficult to add types due to schema barriers. Today, file systems often employ a platform that takes the benefits of a database and builds them into a storage file system. As such, the data in the file system can conform to a pre-defined and pre-installed schema—i.e., a declarative way of describing the form of the data.

As stated above, in emerging file systems, objects are often stored in the database (e.g., file system) and are described by a specialized schema. Data in these file systems is an instance of these schemas types—the types are defined within the schema which defines the shape of the data. Although examples and aspects described herein are directed to database schema scenarios, it is to be understood that other scenarios and implementations of the novel functionality described herein exist whereby an applicable schema can describe documents. These alternative aspects are intended to be included within the scope of this disclosure and claims appended hereto.

Referring initially to the drawings, FIG. 1 illustrates a system 100 that facilitates secure unique identifier generation in accordance with an aspect of the novel innovation. Generally, the system 100 can include a schema installation component 102 that employs a naming component 104 and an identifier generation component 106. It will be appreciated that utilization of these novel components can facilitate secure naming of a schema and attributes associated therewith.

In one aspect, this system 100 can be facilitated in recognition of the frequent desire to securely move and install schemas with respect to multiple stores. Accordingly, in order to securely and accurately accomplish this motion of schemas, the attributes of a schema can be named by a naming component 104 thereby avoiding namespace squatting. By way of example, suppose a scenario directed to an ABC schema having an ABC type inside.

It is particularly important to make sure that this schema (and attributes associated therewith) can be installed into a store while maintaining the security that someone has not taken a name, e.g., ABC schema, which would prevent installation of a very different version of the schema, the ABC schema. Each of these novel components as well as a novel unique identifier generation algorithm will be described in greater detail with reference to the figures that follow.

Figure 2:
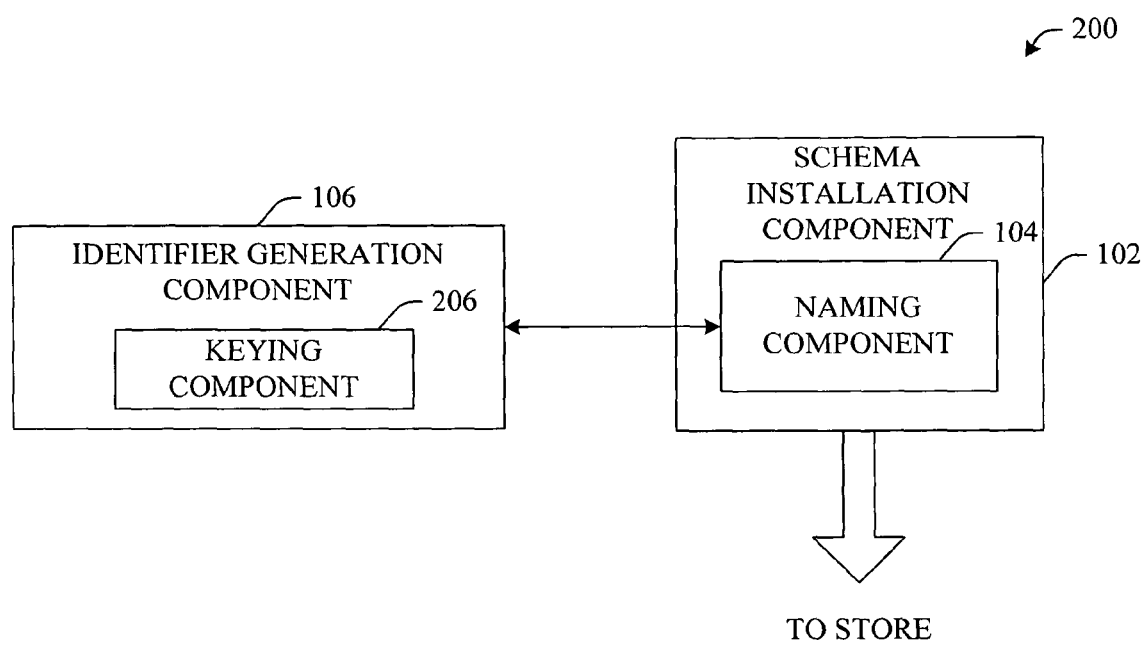
FIG. 2 illustrates a block diagram of a system that employs a keying component to name schema data in accordance with an aspect of the innovation.

Referring now to FIG. 2, an alternative block schematic diagram of a system 200 in accordance with an aspect of the innovation is shown. Generally, the system 200 can include a schema installation component 102, a naming component 104 and an identifier generation component 106. In operation, the schema installation component 102 can facilitate installation of a schema which can include employing a naming component 104 that uniquely names the attributes of a schema. As illustrated the naming component 104 can employ an identifier generation component 106 to effect uniquely naming the attribute or set of attributes.

As disclosed in the just-in-time schema installation procedure of the aforementioned application as well as the novel innovation described herein, a public key can oftentimes be employed to effectuate security of a schema and/or attributes associated therewith. For example, a schema can oftentimes be signed using a private key of a cryptographic key pair. By way of further example, in accordance with the subject innovation, the naming component 104 and the identifier generation component 106 can be employed to effectuate naming an attribute or set of attributes by utilizing the public key portion of a cryptographic key pair 206.

Accordingly, the invention allows any entity to install a schema onto a system so long as the entity is able to provide the public key 206. In one aspect of the invention the public key is included with the schema and so is always available. The public key is by its very nature freely available while the corresponding private key is not freely available. The private key should be securely maintained and is not required for schema installation. The unique naming convention of this system 200 can enable users to install commonly named but, different schemas onto a single system. The commonly named schemas and attributes can be differentiated through the use of the different public keys 206 that are associated with the different private keys that were used to sign the different schemas. Thus, schema squatting, e.g., malicious interception, can be virtually eliminated and avoided.

Figure 3:
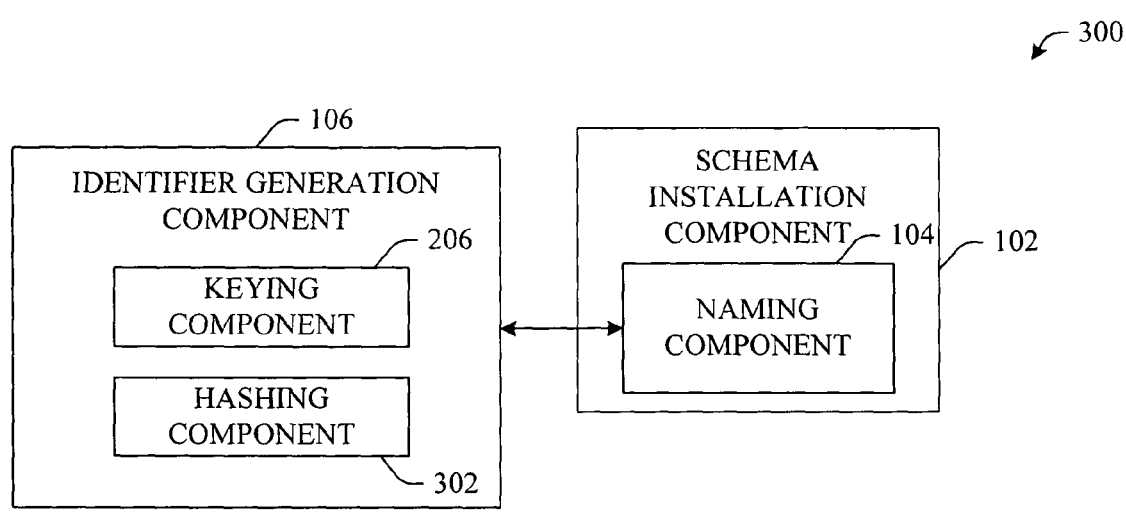
FIG. 3 illustrates a block diagram of a system that employs a keying component and a hashing component to effect secure schema identifier generation in accordance with an aspect.

Turning now to FIG. 3, an alternative system 300 in accordance with an aspect of the novel innovation is shown. In addition to applying a keying component 206 to the schema name as set forth in the aforementioned related application, there are also named items inside the schema for which it is particularly advantageous to uniquely protect thereby preventing squatting. For example, there are types and properties (e.g., attributes) within a schema which can be cryptographically hashed thereby securing these elements. This cryptographic hash can be effectuated via the hashing component 302. As described above, it can be particularly useful to enable a user to install a schema onto a system without explicitly setting forth the name in advance. In other words, it is a novel feature of this innovation to generate a unique schema name (as well as associated type names) when installing the schema rather than explicitly explaining the name upon presentation to a store. It will be appreciated that the latter explicit presentation can leave open an opportunity for schema and identifier squatting.

This subject innovation and system 300 is directed to employing a naming component 104 that uniquely names the schema as well as the information within the schema (e.g., types). This unique naming convention can be accomplished by employing the keying component 206 and the hashing component 302 illustrated integral to the identifier generation component 106 of FIG. 3. It will be appreciated upon a review of the figures that follow, the types, properties and other information contained within the schema can utilize unique identifiers on the system 300 thus effecting secure installation of the schema and associated types.

As previously stated, in conventional systems, a user would most often introduce a schema by name when installing onto a system. As well, in these conventional situations, the user would identify a globally unique identifier (GUID) that corresponds to each type within the schema. One particularly large problem with this approach is that GUIDs can be intentionally, and/or unintentionally, name squatted upon.

With continued reference to FIG. 3, two novel elements of the innovation are the use of a keying component (e.g., public key) 206 as a contribution to the unique identifier name as well as employing a hashing component 302 for the relevant entity (e.g., attributes) names within a schema to automatically produce the remaining portions of the unique identifier.

In other words, the subject system 300 can employ the fact that the schema is being signed and has a public key 206 associated therewith to provide part of the name of the attribute. Additionally, a hashing component 302 can be employed over the entity names to provide a distinguishing characteristic over the disparate entities. In other words, the same public/private key pair 206 can be employed to secure the schema name while the hashing component 302 can be added to the unique identifier to distinguish between the disparate entities (e.g., types) inside the schema.

Figure 4:
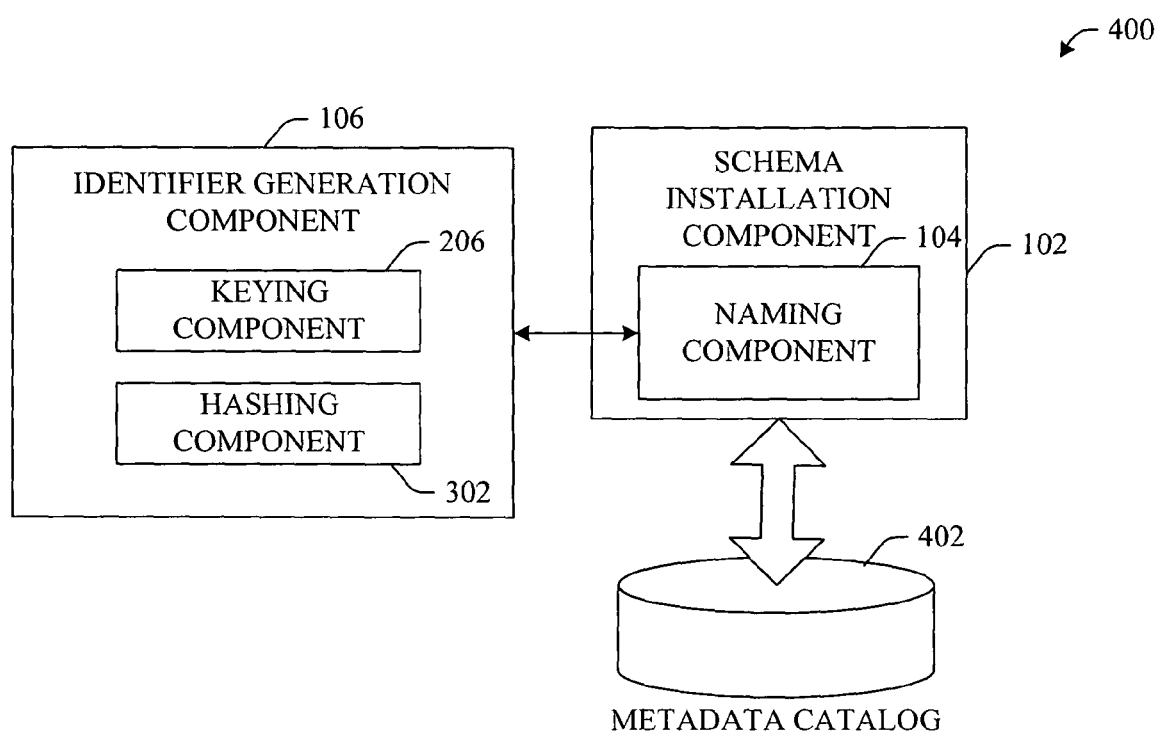
FIG. 4 illustrates a block diagram of a system that employs a metadata catalog in accordance with the secure identifiers of an aspect.

Turning now to a discussion of an aspect having specific identifiers employed within a type definition language, FIG. 4 illustrates an alternative block diagram of a system 400 in accordance with an aspect of the innovation. In operation, one aspect of system 400 can employ an XML file that contains all of the schema information. Inside of the file, it can be particularly advantageous to be able to determine the identifiers in particular cases, e.g., Schema ID. Rather than requiring a type designer to define a Schema ID, which can be an attack vector for a malicious agent, the subject innovation can employ a naming component 104 that can automatically generate the schema ID on a user's behalf. Moreover, the innovation can further provide for automatically generating attribute IDs including, but not limited to, Type ID, Property ID, Set ID and Association ID.

A metadata catalog 402 can be provided and include a plurality of tables that describe the various items in particular. The unique identifiers can be employed as the primary key within a particular table holding that particular type of metadata. Therefore, continuing with the example, in the schema ID, a unique identifier can be the primary key for the schema table and on the type ID, a unique identifier can be the primary key on the type table, etc.

As described above, aspects of the invention are directed to a system and/or methodology that facilitates secure stable, compact, ID generation for a schema and attributes associated therewith. In one aspect, a schema packaging (or definition) component (not shown) can be provided to define a unit of schema installation—a schema package or just package (e.g., schema document) that describes the structure of the data. One issue that can be addressed by the novel innovation is that if two schemas are developed independently, it is important to make sure that the schemas and their contents do not accidentally collide. In other words, it is important to ensure that the two types of documents and their contents do not accidentally appear to the destination machine or store as the same type of document or that the contents of one effects the other. As will be understood upon a review of the disclosure herein, the novel naming and identifier conventions described herein can particularly address this scenario.

In order to support the just-in-time installation of a schema as set forth in the aforementioned related application, a signed schema package can be presented to the store for installation. The schema package offers a number of advantages, but these are negated if the package is not easily available for installation. Aspects of the innovation describe how a secure, stable, compact identifier can be generated for the schema package thus effectuating secure motion of the schema(s). Referring again to FIG. 4, the system 400 can affect installation of an appropriate schema package while maintaining security and reliability of the schema.

In accordance with aspects of the novel schema system, schema installation component 102 can employ a naming component 104 which enables security with respect to the schema and attributes associated therewith.

It is to be understood that the above ensures that whenever the client application instantiates an instance of a schematized type for persistence in a store, the client has access to the schema package. As well, the novel systems and methods described herein can eliminate any unintentional (or intentional) collisions of schemas by employing a secure identifier for the schema package and attributes associated therewith. It will be appreciated that, if the required schema is not currently available in the store, the schema package can be installed (e.g., via schema installation component 102) into the store prior to presenting the data.

Before an instance can be saved to a file system store, its schema (and that of all types in the instance's object tree) has to be present. In the case where the store is missing the schema, it must be installed prior to saving into the store. The subject novel naming convention can ensure that the correct schema and attributes are made available while, at the same time, eliminating collisions and maintaining security.

Rather than transmitting a schema in its original form, a schema can be "packaged" to give it a few desired characteristics while preserving its content. In particular the schema package is signed using a private key of a cryptographic pair and in one particular instantiation of the invention the public key is available as a part of the schema package. Further, it is to be understood that the schema package does not contain any custom or executable code. Accordingly, such a schema is the only unit of schema installation. As illustrated, the naming component 104 can employ an identifier that includes a public key of a cryptographic key pair as part of the name of the schema (e.g., Schema ID). This public key can be made available via the identifier generation component, and more specifically, the keying component 206. In one particular instantiation of the invention the public key is available from the schema package.

It is to be appreciated that the signing of a schema facilitates a system to eliminate the threat of schema squatting. In accordance with an aspect of the subject invention, this can be achieved by using the public key of a mathematically related cryptographic key pair as a part of the schema's name. Use of the key in a given schema name requires the possession of the private key of that key pair. Since only the original schema owner has the private key, only the original schema owner can be sure to provide the corresponding public key. Accordingly, this provides protection against both accidental and intentional schema squatting.

As described above, another attack vector for squatting can occur through any unique identifier that the schema contains or that is required to be generated from the contents of the schema. If identifiers are globally unique in the metadata catalog 402, it would be possible for an installed schema to prevent the installation of another schema if the installed schema, by chance, used the same unique identifier for some object that the schema to be installed contains. For instance, suppose a malicious schema, MyBadSchema, used the same TypeId in one of its types as another vendor's schema, VendorGoodSchema. Further, suppose that MyBadSchema was installed in the store first. Installation of VendorGoodSchema would fail because the metadata catalog 402 unique index on TypeId over the Types table would be violated.

It is to be appreciated that it is a novel element of the subject identifier generation (e.g., via identifier generation component 106) to employ the public key of a cryptographic key pair as a contribution to the unique identifier's value. Additionally, it is novel to employ hashes (e.g., Secure Hashing Algorithm 1 (SHA1)) over the relevant entity names and other information within a schema to automatically produce the remaining portion of the unique identifier.

In accordance therewith, unique identifiers can be used to identify entities rather than employing the full strong name for the entity. It will be appreciated that this novel naming convention can offer various performance benefits as the unique identifier is significantly smaller than the strong name. Additionally, if desired, the use of unique identifiers can be fixed rather than variable in length.

Following is an exemplary aspect of a unique identifier with respect to a schema/type definition language. It is to be understood that this aspect is included to provide context to the invention and is not intended to limit the invention in any way. As such, it will be appreciated that other aspects exist which employ the novel functionality described herein, these additional aspects are to be included within scope of this disclosure and claims appended hereto.

In accordance with the exemplary aspect of FIG. 4, the following unique identifiers can be employed in a Schema/Type Definition Language:

| Attribute | Element(s) | Purpose |
| --- | --- | --- |
| SchemaId | Schema | Uniquely identifies the schema in the Metadata Catalog. A unique index appears on the Schemas table in the Metadata Catalog to enforce this. This value also serves as a pseudo foreign key between the Schemas table and the ReferencedSchema collection in each Schema to encode dependencies. |
| TypeId | EntityType, InlineType, EntityExtension, Enumeration, EntityFragment | Uniquely identifies the type in the Metadata Catalog. A unique index appears on the Types table in the Metadata Catalog to enforce this. This value also serves as a pseudo foreign key between the Types table and Properties and ChangeUnits tables to encode property and change unit ownership. |
| PropertyId | Property (Non-Sets) | Uniquely identifies the property in the Metadata Catalog. A unique index appears on the Properties table to enforce this. |
| SetId | Property (Sets) | Uniquely identifies a set of objects that belong to a large set property. A unique index is used to enforce this. |
| AssociationId | Association | Uniquely identifies the association in the Metadata Catalog. A unique index appears on the Associations table in the Metadata Catalog to enforce this. |

A solution to the unique identifier squatting attack vector is to ensure that the unique identifiers used by a schema be mathematically related to the public key in a manner that can not be easily spoofed by malicious agents. To this end unique identifiers can be computed at installation time by combining the n-bytes of the public key (or a hash, e.g., SHA1, of the public key) with the first n-bytes of the hash (e.g., SHA1) over other objects computed as shown in the following table.

| Attribute | Library Schema | Platform Schema |
|---|---|---|
| SchemaId | hash over Namespace, Version, Culture | Hash over Namespace, Culture |
| TypeId | hash over Namespace, Version, Culture, TypeName | Hash over Namespace, Culture, TypeName |
| PropertyId | hash over Namespace, Version, Culture, TypeName, PropertyName | Hash over Namespace, Culture, TypeName, PropertyName |
| SetId | hash over Namespace, Version, Culture, TypeName, PropertyName | Hash over Namespace, Culture, TypeName, PropertyName |
| Association Id | hash over Namespace, Version, Culture, AssociationName | hash over Namespace, Culture, AssociationName |

It is to be appreciated that there can be variations for what a user may prefer for the different behaviors for different types. It is to be understood that platform schemas do not take the version number into account when computing identifiers. This is because it is particularly important that these identifiers be stable across multiple versions of a platform schema. (Platform schemas are used to ensure forward / backward compatibility and allow additive only evolution. Maintaining the stability of identifiers across version numbers is an important performance consideration for both upgrade and cross store data transfer scenarios.) Library schemas, however, must provide different values for these unique identifiers in subsequent versions to ensure side by side installation of different versions (while also facilitating efficiencies in cross-store data transfer scenarios for the same version number).

As shown in the table above, in library schemas, version numbers can be encoded in the hash using only their major and minor numbers written as a string of the form "major.minor". If a servicing and/or build number is employed (e.g., if the version used is the same as the client side assembly that provides the implementation of the type) the value will not be included in the hash computation for the same reason given set forth above (i.e., to maintain the stability of the identifiers).

Once a unique identifier is determined, the identifier can be turned into a 16 byte identifier. In particular, the two parts (public key token and object hash(es)) of the algorithm can be composed together to effect uniqueness of the schema and properties within the schema (e.g., attributes from the above tables). In one aspect, once unique identifiers have been computed using the above technique they can have the following form (for 16-byte identifiers whose first 8-bytes are from the public key):

AAAAAAAA-AAAA-AAAA-BBBB-BBBBBBBBBBBB

In accordance with the example above, the A's can be replaced by the first 8-bytes of the hash (e.g., SHA1) of the public key and the B's can be replaced with the first 8-bytes of the hash (e.g., SHA1) computed from the table above. Using the large level granularity first, e.g., the A's, means that when the system prefixes with common values, better clustering on the metadata in the index of the metadata catalog 402 can be effectuated. This means that all of the types of a particular schema designer that utilizes a particular key pair will be clustered together. This may have particular performance benefits as oftentimes designers employ their individual types in applications. In other words, applications tend to use types from the same schemas rather than types from a number of disparate schemas.

Although the subject invention eliminates schema squatting, promotes clustering and therefore greater performance, it should be understood that the novel functionality described herein does not take away from systems in any way. It is further to be appreciated that the A's in the example above are being pictured first in the scenario as there may be a desire to have better clustering in the metadata catalog 402 around values from the same schema. In other aspects, if clustering requires that the last bits be more similar instead of the first, this order can be reversed.

Referring again to the example above, the example depicts a 16-byte identifier. It is to be appreciated that this novel feature of the invention can be applied to any size identifier within the bounds of the key and hash sizes used. The unique identifiers computed using the above subject mechanism can be particularly stable across all uses of the schema and can be coded against in the same manner as if explicit declared unique identifiers are employed. Furthermore, the fully computed unique identifiers can be available for query in the metadata catalog 402, exposed in the same manner as explicitly declared identifiers.

Figure 5:
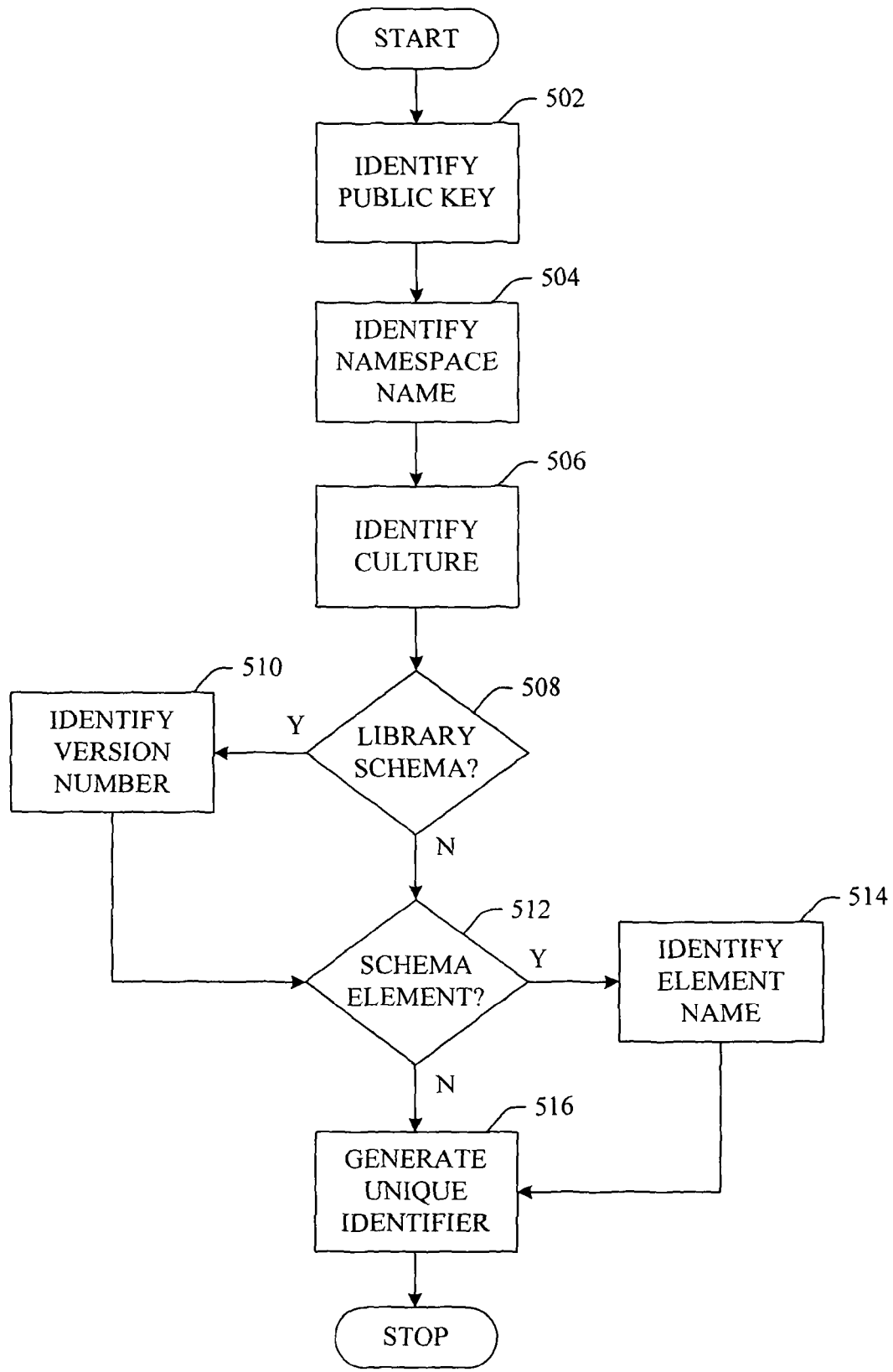
FIG. 5 illustrates an exemplary flow diagram of a methodology that affects generating a unique identifier(s) in accordance with an aspect of the invention.

Referring now to FIG. 5, a methodology of uniquely naming a schema (and attributes associated therewith) in accordance with an aspect of the invention is shown. While, for purposes of simplicity of explanation, the one or more methodologies shown herein, e.g., in the form of a flow chart or flow diagram, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

As illustrated in FIG. 5, in order to uniquely name a schema (as well as entities therein), at 502, a public key of a cryptographic key pair is identified. Next, at 504, the namespace name is identified. At 506, the culture is identified. At 508, a determination is made if the subject schema is a library schema.

If a determination is made at 508 that the subject schema is a library schema, at 510, the version number is identified. After the version number is identified or if a determination is made that the subject schema is not a library schema (e.g., platform schema), at 512, a determination is made if the unique identifier is to be applied to applied to a schema itself or an element within the schema.

If it is determined that the unique identifier is be applied to an element, at 514, the element name is identified. As illustrated in the above table, it will be understood that the elements can include, but are not limited to include, a type, a property, a set and an association.

Once all of the values are identified, the unique identifier can be established at 516. This is achieved by generating one or more hashes (for example, via SHA1) over the concatenation of the values identified. As described supra, although the aspects described herein employ the SHA1 hashing algorithm, it is to be understood and appreciated that any hashing algorithm can be employed without departing from the innovation described herein. It is to be appreciated that various concatenations and hashes of the elements identified in 502, 504, 506, 510, and 514 are possible. In other words, in one particular instantiation as described in the A/B example above, a hash over the public key (to generate As in the example above) can be combined with a hash over the concatenation of the remaining values (to generate Bs in the example above) to generate a unique identifier. Also as described above, although a 16 byte identifier is described, this unique identifier can be of any desired length without departing from the spirit and scope of the disclosure herein and claims appended hereto.

As described supra, any public/private cryptographic key pair can be employed in accordance with the innovation. In one example, a public key cryptography technique can be employed upon generating the schema package. Public key cryptography can refer to a cryptographic method that uses a two-part key (e.g., unique code) that includes a public and private component. In order to encrypt messages, the unpublished private key known only to the sender is used. Accordingly, to decrypt the messages, the recipients can use the published public key of the sender. In other words, the public key can refer to the published part of a two-part, public key cryptography system.

The private part of the key pair is known only to the owner. Accordingly, a schema author can use the unpublished private key to cryptographically sign the schema package. This cryptographic security method can greatly enhance authenticity, security and integrity of the schema information. It should also be understood that any method of uniquely naming and/or signing can be employed without departing from the spirit and scope of the invention and claims appended hereto.

Figure 6:
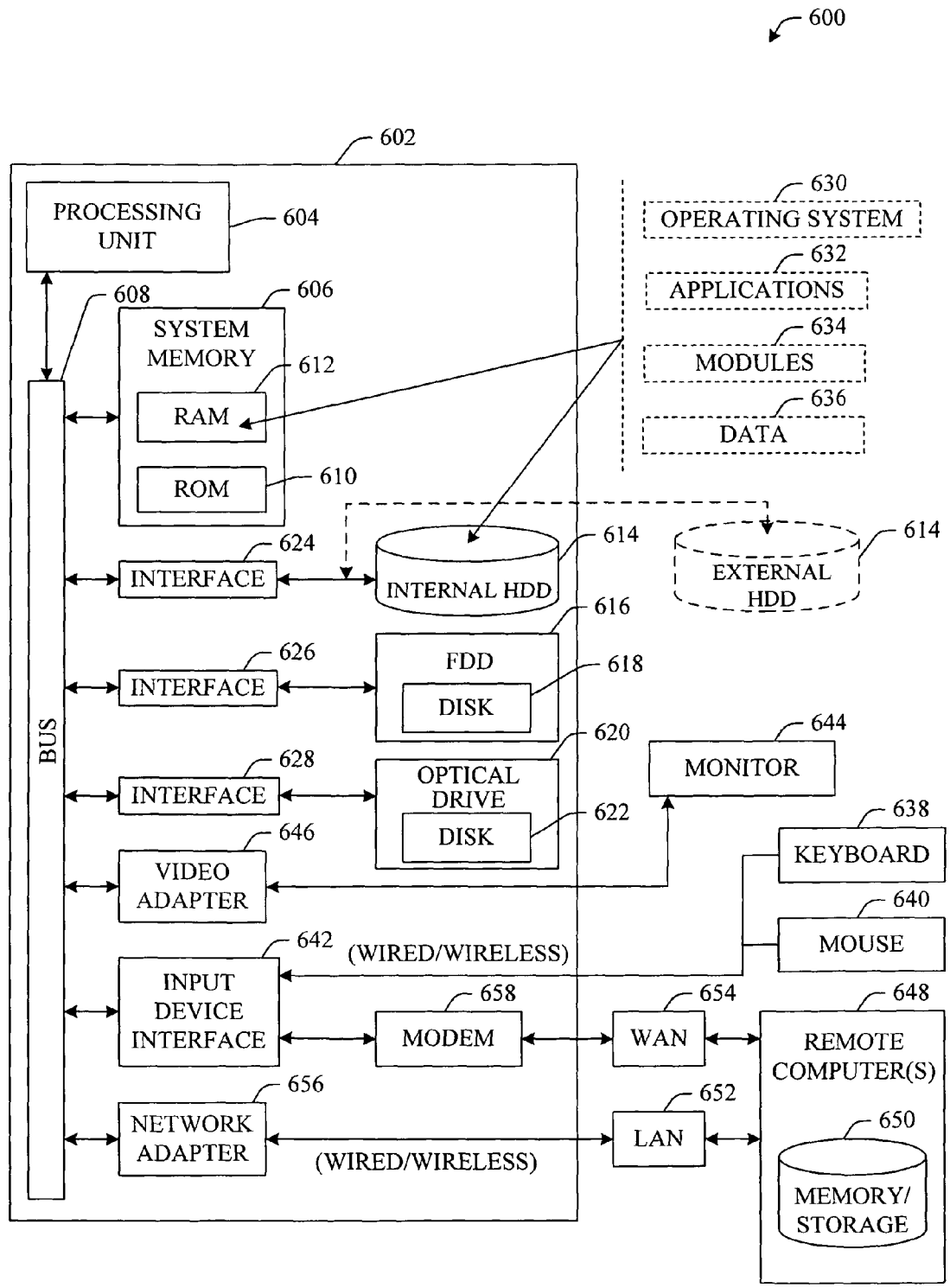
FIG. 6 illustrates a block diagram of a computer operable to execute the disclosed architecture.

Referring now to FIG. 6, there is illustrated a block diagram of a computer operable to execute the disclosed architecture of generating secure schema identifiers. In order to provide additional context for various aspects of the subject invention, FIG. 6 and the following discussion are intended to provide a brief, general description of a suitable computing environment 600 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the exemplary environment 600 for implementing various aspects of the invention includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a nonvolatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618 ) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 612, including an operating system 630, one or more application programs 632, other program modules 634 and program data 636. All or portions of the operating system, applications, modules, and/or data can also be cached in the RAM 612. It is appreciated that the invention can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 1OBaseT wired Ethernet networks used in many offices.

Figure 7:
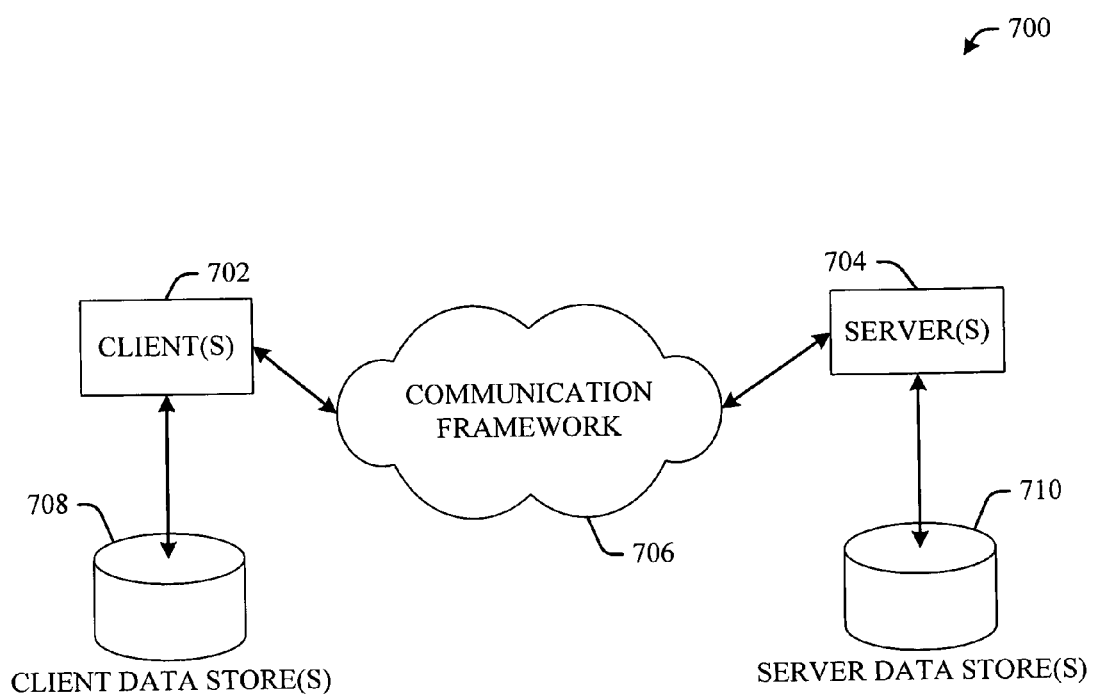
FIG. 7 illustrates a schematic block diagram of an exemplary computing environment in accordance with the subject invention.

Referring now to FIG. 7, there is illustrated a schematic block diagram of an exemplary computing environment 700 in accordance with the subject secure schema identifier system. The system 700 includes one or more client(s) 702. The client(s) 702 can be hardware and/or software (e.g., threads, processes, computing devices). The client(s) 702 can house cookie(s) and/or associated contextual information by employing the invention, for example.

The system 700 also includes one or more server(s) 704. The server(s) 704 can also be hardware and/or software (e.g., threads, processes, computing devices). The servers 704 can house threads to perform transformations by employing the invention, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 604 are operatively connected to one or more server data store(s) 710 that can be employed to store information local to the servers 704.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising:
   a processor;
   a schema installation component configured to:
      receive a public key of a cryptographic key pair;
      receive an unnamed schema; and
      install the unnamed schema onto the computer-implemented system based, at least, on a received public key;
   a naming component configured to:
      name the unnamed schema based, at least, on the received public key;
   a hashing component configured to assign a unique name to one or more attributes of the unnamed schema utilizing the public key, wherein the unique name comprises:
      a first portion that includes the public key; and
      a second portion that includes a hash value related to an attribute associated with the unique name, and
         wherein the unique name is 16 bytes, and the first 8 bytes within the 16 bytes includes a hash of the public key for facilitating clustering in a metadata catalog; and
   a computer-readable storage medium storing instructions that, when executed by the processor, cause the processor to implement at least one of the schema installation component, the naming component or the hashing component.

2. The computer-implemented system of claim 1, wherein the unnamed schema is a library schema, and wherein the schema installation component is configured to install a plurality of versions of the library schema, and wherein the hashing component is configured to encode a version number associated with at least one of the plurality of versions of the library schema.

3. The computer-implemented system of claim 1, wherein the schema installation component is further configured to:
   receive a named schema; and
   differentiate between commonly named schemas as a function of a unique public key associated with one or more of the commonly named schemas.

4. The computer-implemented system of claim 1, wherein the one or more attributes of the unnamed schema comprise at least one of a type, a property, a set or an association.

* * * * *